(12) United States Patent
Poirier et al.

(10) Patent No.: US 7,442,120 B2
(45) Date of Patent: Oct. 28, 2008

(54) CONNECTION ADAPTER FOR CONDUITS AND VENTILATION UNITS

(75) Inventors: Bertrand Poirier, Notre-Dame (CA); Danny Brun, Shediac (CA); Joel Bourque, Shediac Cape (CA); Bertrand Michaud, Shediac (CA)

(73) Assignee: Imperial Sheet Metal Ltd. (CA)

( * ) Notice: Subject to any disclaimer, the term of this patent is extended or adjusted under 35 U.S.C. 154(b) by 14 days.

(21) Appl. No.: 10/514,875

(22) PCT Filed: May 15, 2003

(86) PCT No.: PCT/CA03/00688

§ 371 (c)(1),
(2), (4) Date: Sep. 15, 2005

(87) PCT Pub. No.: WO03/098121

PCT Pub. Date: Nov. 27, 2003

(65) Prior Publication Data

US 2006/0111037 A1    May 25, 2006

(30) Foreign Application Priority Data

May 15, 2002   (CA) .................................... 2386569

(51) Int. Cl.
*F24F 13/02*      (2006.01)
*F16L 41/00*      (2006.01)
(52) U.S. Cl. ........................ 454/270; 454/243; 285/325
(58) Field of Classification Search ................ 454/270, 454/305, 243; 289/139.3, 141.1, 142.1; 34/235; 285/139.3, 141.1, 142.1, 325, 326, 327
See application file for complete search history.

(56) References Cited

U.S. PATENT DOCUMENTS

| 2,159,116 | A | * | 5/1939  | Zacharias ...................... 285/7 |
| 2,799,518 | A |   | 7/1957  | Anderson |
| 3,185,506 | A |   | 5/1965  | Szlashta |
| 3,605,797 | A | * | 9/1971  | Dieckmann et al. ......... 137/375 |
| 3,656,782 | A |   | 4/1972  | Molino |
| 4,054,158 | A | * | 10/1977 | Hoeman et al. ............. 138/155 |
| 4,081,915 | A | * | 4/1978  | Materniak nee Babcerowicz et al. ............................ 34/235 |
| 4,334,461 | A | * | 6/1982  | Ferguson et al. ............ 454/214 |
| 4,867,232 | A |   | 9/1989  | Dewil |
| 4,930,815 | A |   | 6/1990  | Tuggle |

(Continued)

FOREIGN PATENT DOCUMENTS

GB            894766         4/1962

*Primary Examiner*—Steven B. McAllister
*Assistant Examiner*—Patrick F. O'Reilly, III
(74) *Attorney, Agent, or Firm*—Schmeiser, Olsen & Watts

(57) ABSTRACT

The present invention provides a connection adapter for use with a flexible or rigid conduit that fluidingly interconnects an intake or exhaust port of a ventilation unit and a conduit. The adapter comprises a unit coupler (10) having a central portion (60) with an aperture (70) and an elongated sleeve (80) aligned with the aperture (70) and extending from the central portion (60). The unit coupler (10) can be secured to a port of a ventilation unit such that the elongated sleeve (80) projects through a port into the casing of the ventilation unit. The adapter also comprises a conduit coupler (20) having a central portion (100) with an aperture (110) and an inner elongated sleeve (120) extending from the central portion (100) that is aligned with the aperture (110) of the conduit coupler (20).

20 Claims, 11 Drawing Sheets

U.S. PATENT DOCUMENTS

| | | | |
|---|---|---|---|
| 5,096,230 A * | 3/1992 | Pausch et al. | 285/9.1 |
| 5,165,732 A * | 11/1992 | Townsend | 285/226 |
| 5,257,468 A * | 11/1993 | Lebrun | 34/235 |
| 5,584,129 A * | 12/1996 | Williamson | 34/235 |
| 6,062,608 A * | 5/2000 | Gerth | 285/123.15 |
| 6,082,704 A * | 7/2000 | Grinbergs | 251/96 |
| 6,173,997 B1 * | 1/2001 | Nordstrom et al. | 285/139.1 |
| 6,195,910 B1 * | 3/2001 | Robineau | 34/417 |
| 6,443,834 B1 * | 9/2002 | Berger | 454/353 |
| 6,478,673 B1 * | 11/2002 | Haynes | 454/292 |
| 6,640,461 B1 * | 11/2003 | Berger | 34/140 |

* cited by examiner

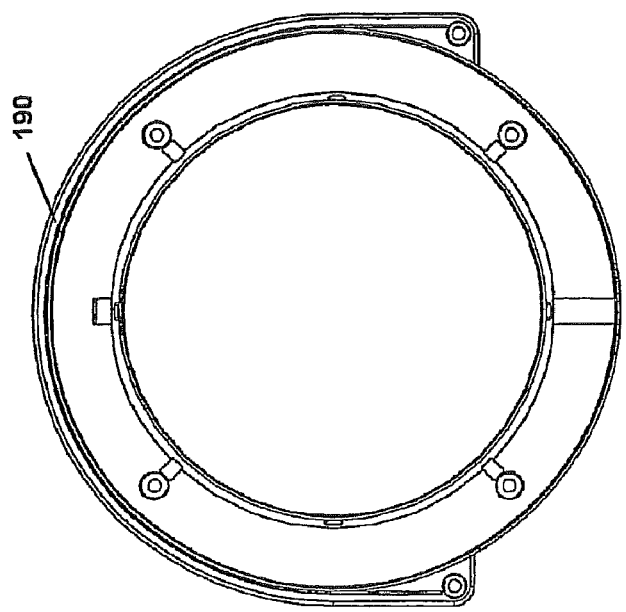
FIGURE 3B
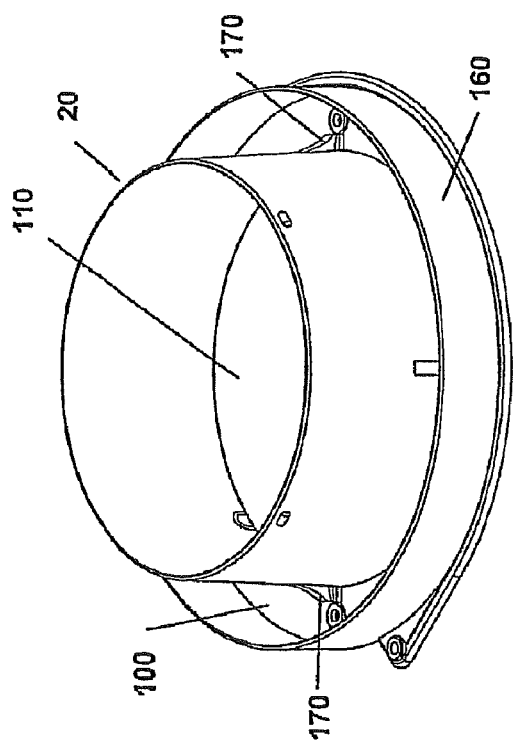
FIGURE 3A
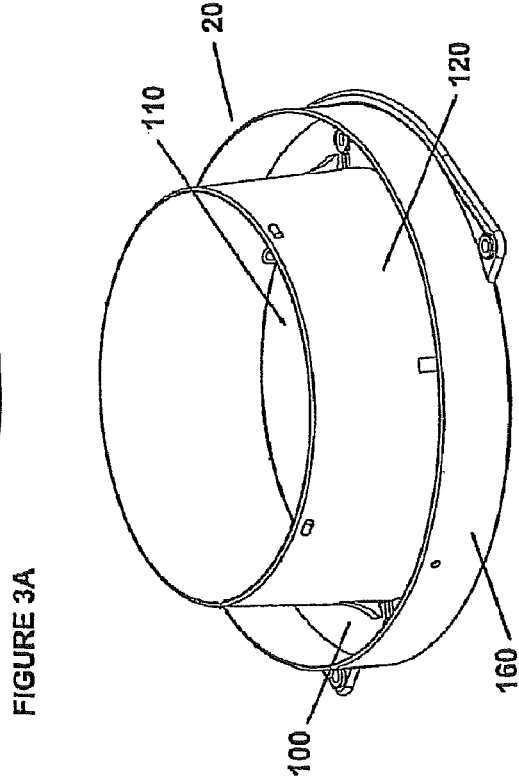
FIGURE 3C
FIGURE 3D

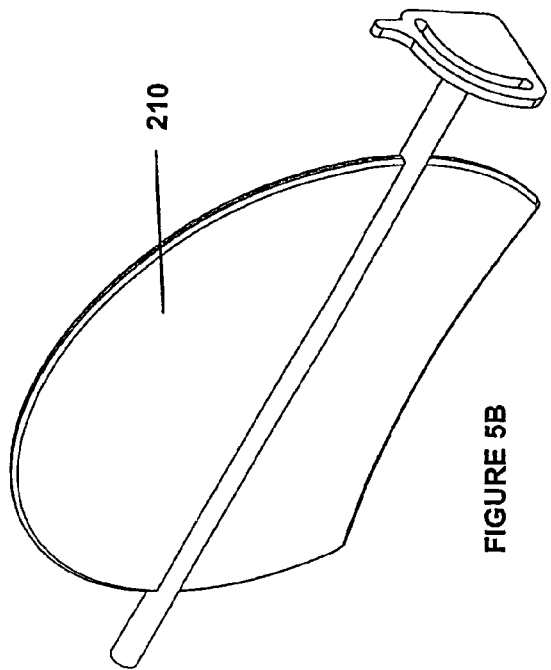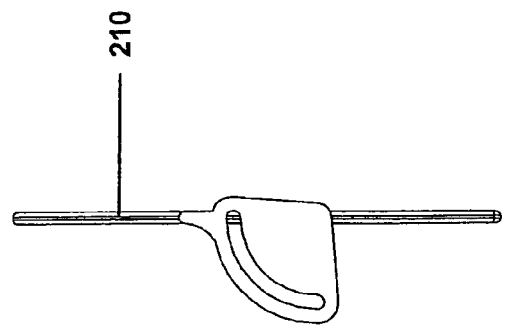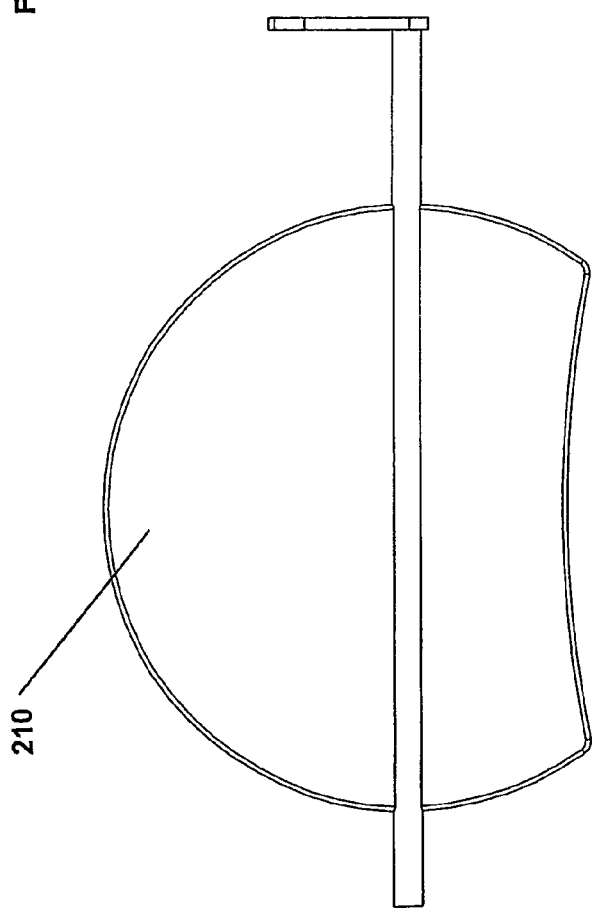
FIGURE 5B
FIGURE 5C
FIGURE 5A

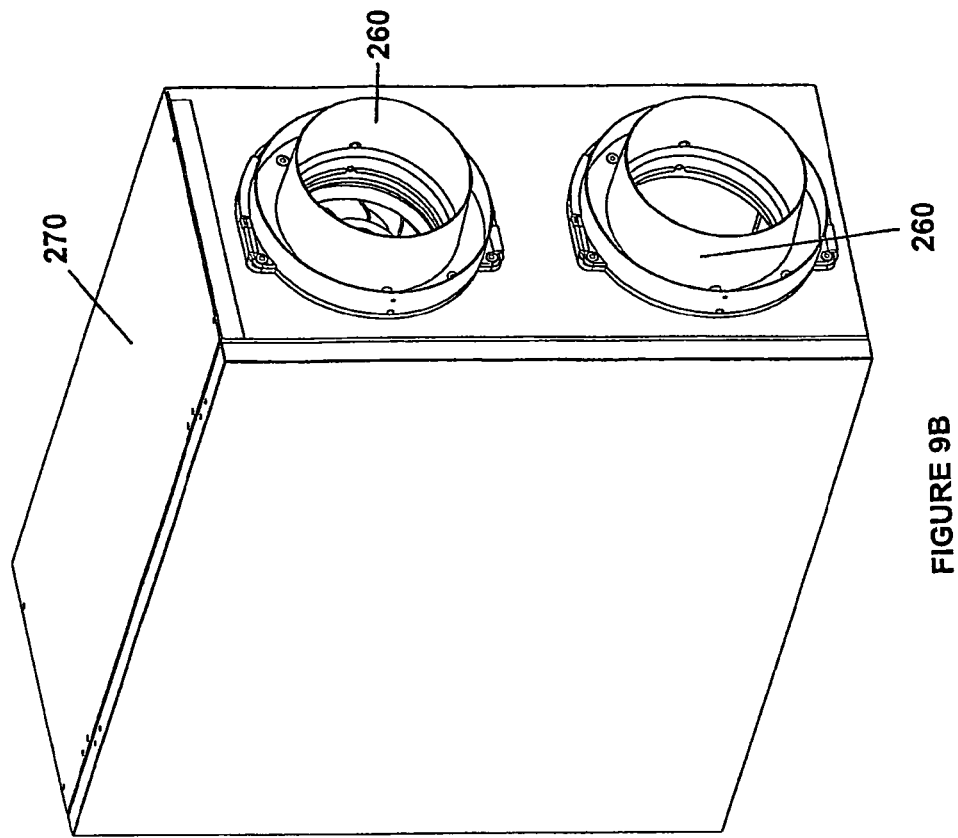
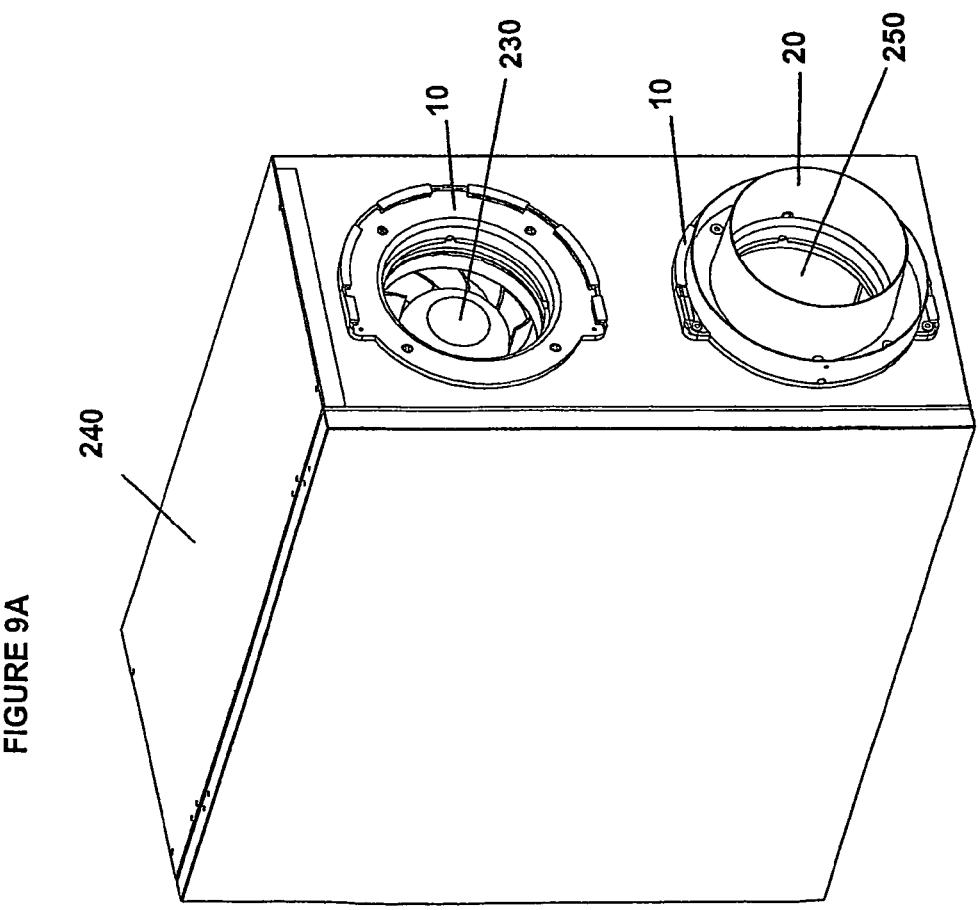

CONNECTION ADAPTER FOR CONDUITS AND VENTILATION UNITS

FIELD OF THE INVENTION

The present invention pertains to the field of conduit adapters and more specifically to an adapter for conduits and ventilation units that enables repeated connection and disconnection.

BACKGROUND

Various types of connection coupling assemblies are known and disclosed in the art, such as connecting flexible tubes utilized in the biomedical applications, instrument connection, fluid dispensing assembly, etc.

Different types of exhaust hoses, tubing, ducts and the like are conventionally used to transfer substantial quantities of air from conventional ventilation units to corresponding exhaust ports that lead to an external location. A vent is also sometimes provided by removing a window pane for installation of the latter. Regardless of the type of room exhaust port, a suitable hose or tubing is typically installed to interconnect the ventilation unit to the room outlet port for evacuating air from within a building to an outside volume of ambient air.

To prevent several types of unfortunate situations, care must be brought in installing the exhaust tubing and in sealing both ends of the latter. Indeed, if both ends of the exhaust tubing are not properly sealed respectively to the ventilation unit and the wall outlet port, moist air and/or associated residual lint may escape resulting in mildew, dust and the like with the associated potential health risks and/or structural damages.

Kinking, bending or otherwise altering the shape of the exhaust conduit, not only potentially creates the hereinabove mentioned drawbacks but also potentially greatly decreases the efficiency of ventilation units. Hence, in spite of the initial efficiency of the ventilation unit as manufactured, and the theoretical connection to a freely flowing exhaust, in practice ventilation units may well not achieve this type of efficiency and moreover, the ventilation unit and/or the vent duct are susceptible to overheating because of inadequate air flow through the vent system, and collection of combustible lint. This type of problem presents itself not only during installation but also when maintenance or replacement of the ventilation unit is required.

There exists a plurality of situations wherein inlet or outlet tubes, ducts, hoses and the like need to be releasably connected to corresponding inlet or outlet ports. One common example is found in the field of conventional household laundry dryers. Several structures have been proposed in the prior art relating to the field of convential laundry dryers. Several structures have been proposed in the prior art attempting to circumvent the hereinabove mentioned problems. For example, U.S. Pat. No. 4,334,461 issued Jun. 15, 1982 discloses a portable window vent screen that includes an aperture extending therethrough. A ventilator is positioned adjacent the outer surface of the vent screen bolted to an adapter on its inner surface. A flexible hose from a dryer is detachably attachable to the adapter whenever the dryer is used.

The dryer vent disclosed in U.S. Pat. No. 4,334,461 however suffers from being destined to be used only through window screens or the like. It is not adapted for use with conventional wall outlet ports typically located adjacent the intersection between the rear and bottom walls part of the dryer housing.

Furthermore, U.S. Pat. No. 5,257,468 1993 discloses a dryer air outlet hose coupling. The coupling includes a first coupler having a cylindrical flue releasably anchored to the drying machine back wall, while a second coupler includes a cylindrical flue anchored to the laundry room floor. In one embodiment, the flues are both horizontal while in a second embodiment the flues are vertical. In a third embodiment, one hose coupler is slidable along a ground rail integral to the second hose coupler, the latter being fixed to the ground. An operative position is defined, where the cylindrical flues of the two hose couplers become coaxial to one another. In all cases, by displacing the dryer towards the second coupler, the latter will engage edgewisely the first coupler to become coaxial therewith. A first flexible hose interconnects the first flue to the machine air outlet port, while a second flexible hose interconnects the second flue to the outside.

The field of ventilation unit uses various types of coupling assemblies or conduit adapters enabling conduits to be fitted on units. Known adapters with male and female components may be used, however, the use of such adapters require a securing device to assure a proper fit of both components.

Given these examples, there is a need for a quick-connect/disconnect adapter which will enable conduits to be easily positioned on ventilation units or other appliances which require the exhaust or intake of a gaseous fluid. There is need for an adapter that enables the installation of various conduits through the use of single component of the adaptor of the present invention.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a connection adapter. In accordance with an aspect of the present invention, there is provided a connection adapter for use with a flexible or rigid conduit that fluidingly interconnects with an intake or exhaust port of a ventilation unit and a conduit, the adapter comprises a unit coupler having a central portion with an aperture and an elongated sleeve extending from the central portion and aligning with the aperture. The adapter also comprises a conduit coupler having a central portion with an aperture and an inner elongated sleeve extending from the central portion and aligning with the aperture of the conduit coupler. The conduit coupler has an outer elongated sleeve extending from the central portion in the same direction as the inner sleeve. The adapter further comprises interconnecting means on the unit coupler and the conduit coupler which mate thereby enabling interconnection. The adapter further comprises a securing mechanism for securing the unit coupler to the conduit coupler wherein the conduit coupler is easily connected or disconnected to the unit coupler once the securing mechanism is removed.

BRIEF DESCRIPTION OF THE FIGURES

FIG. 3a is a first perspective view of the conduit coupler of the present invention;

FIG. 3b is a plan view of the conduit coupler of the present invention;

FIG. 3c is a second perspective view of the conduit coupler of the present invention;

FIG. 3d is an elevation view of the conduit coupler of the present invention;

FIG. 5a is a plan view of a balance flap under one embodiment of the present invention;

FIG. 5b is a perspective view of a balance flap under one embodiment of the present invention;

FIG. 5c is an elevation view of a balance flap under one embodiment of the present invention;

FIG. 9a is a perspective view of one embodiment of the present invention;

FIG. 9b is a perspective view of one embodiment of the present invention;

DETAILED DESCRIPTION OF THE INVENTION

Definitions

The term "ventilation unit" is used to define any unit or system that is commonly used in the field of ventilation, heating or air conditioning, wherein movement of air is provided by this unit.

Unless defined otherwise, all technical and scientific terms used herein have the same meaning as commonly understood by one of ordinary skill in the art to which this invention belongs.

The present invention provides a connection adapter that may be used with ventilation units or dryers or like devices wherein the movement of air is provided. For simplicity, the reference is made to ventilation units however this device may readily be varied as would be known to a worker skilled in the art.

The adapter comprises a unit coupler which is secured to an intake or exhaust of a ventilation unit and a conduit coupler which is secured to a flexible or rigid conduit, wherein the unit coupler and the conduit coupler releasably mate, thereby connecting the conduit to the ventilation unit. The unit coupler comprises a central portion having an aperture therein and a hollow elongated sleeve aligned with this aperture. The conduit coupler comprises a central portion having an aperture and inner and outer elongated sleeves extending therefrom, wherein the inner elongated sleeve is aligned with the aperture and can be connected to a conduit. The outer elongated sleeve of the conduit coupler can provide an attachment location for an additional sheath if required. Interconnecting means releasably connect the unit coupler and conduit coupler in a mating manner thereby creating the adapter of the present invention. Securing means are additionally associated with the adapter in order to maintain the interconnection of the conduit coupler and the unit coupler during operation of the ventilation unit, for example. This adapter enables easy disconnection and reconnection of a conduit from or to a ventilation unit thereby providing ease of access to a ventilation unit during maintenance, for example.

Connection Adapter Components

Figure 1:
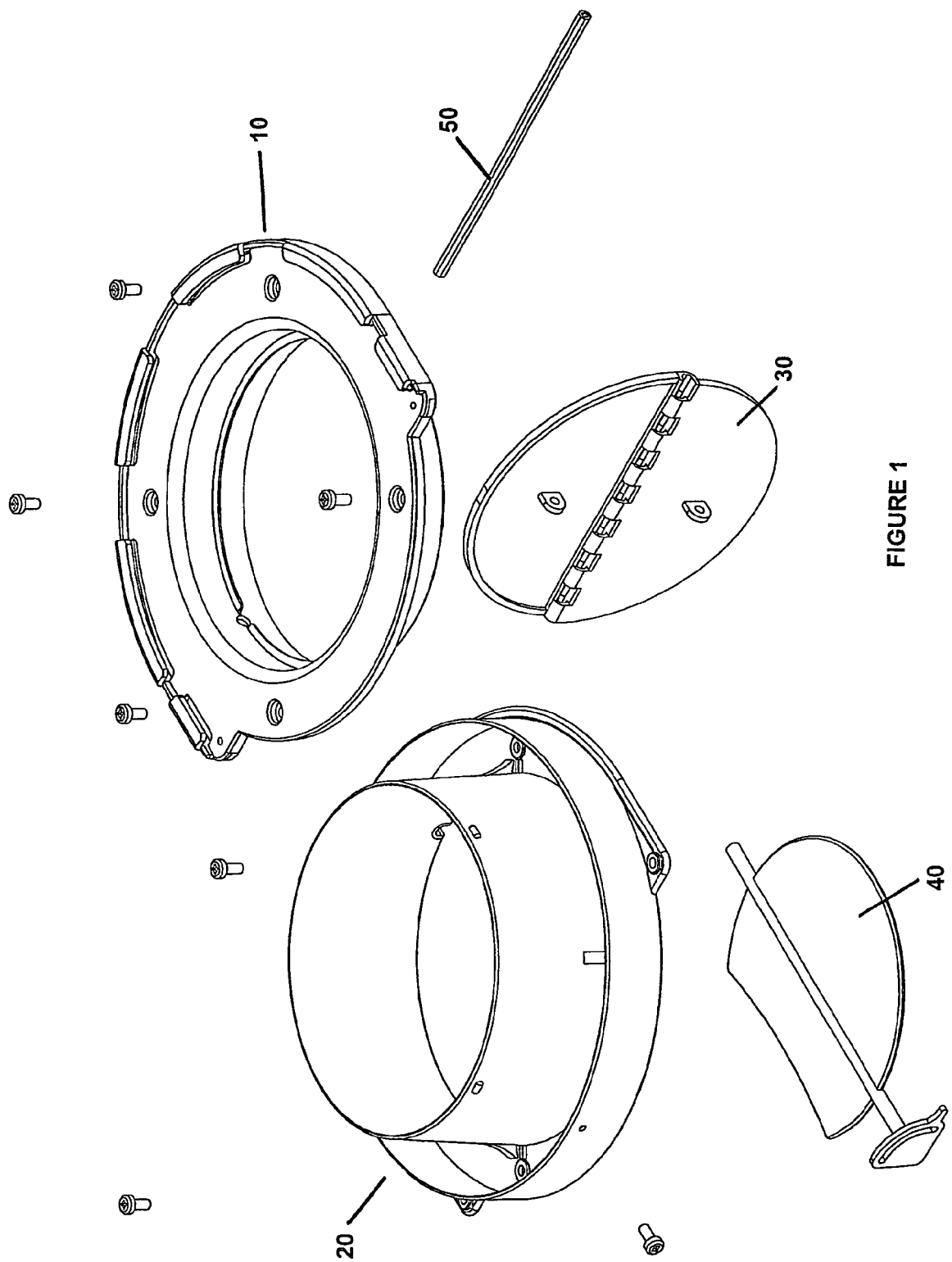
FIG. 1 is an exploded view of one embodiment of the present invention.

In one embodiment of the invention and with reference to FIG. 1, the connection adapter comprises two independent coupling members defined as the unit coupler 10 and conduit coupler 20. The unit coupler is secured on a ventilation unit and the conduit coupler is secured to a conduit, wherein the interconnection of the two couplers enables the attachment of a conduit to a ventilation unit. The design of the connection coupler enables one to connect and disconnect the conduit coupler from the unit coupler in an easy and rapid manner. The connection adapter may optionally include a control flap 30 or a balance flap 40 which can be installed in the connection adapter using a rod 50, for example. The movement of these flaps may enable the modification of air flow within a conduit.

Unit Coupler

Figure 2B:
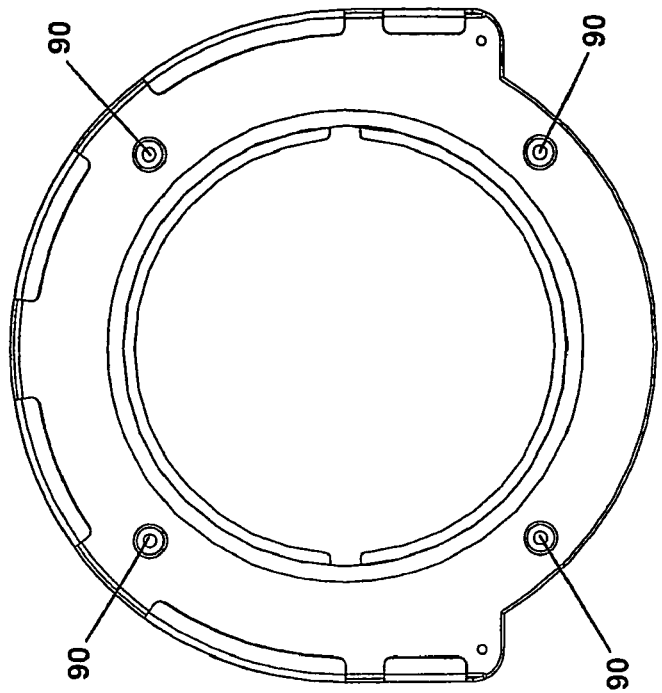
FIG. 2b is a plan view of the unit coupler of the present invention.
Figure 2D:
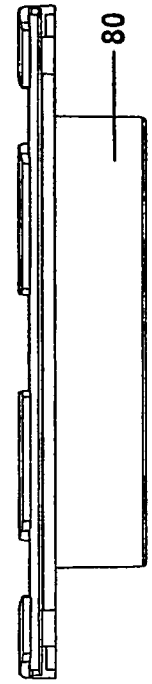
FIG. 2d is an elevation view of the unit coupler of the present invention.
Figure 2A:
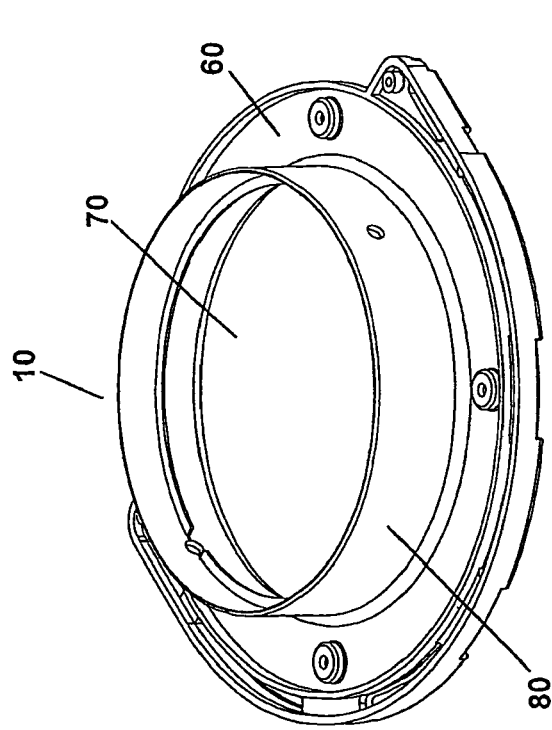
FIG. 2a is a first perspective view of the unit coupler of the present invention.

Referring to FIG. 2a, the unit coupler 10 comprises a central portion 60 in which an aperture 70 is formed having a cross sectional area similar to the cross sectional area of an intake or exhaust port commonly used in ventilation units. The size and cross sectional shape of the aperture may be of any size or shape, depending on the application of the connection adapter.

In one embodiment, the unit coupler 10 further comprises, a hollow elongated sleeve 80, also shown in FIG. 2d, which extends from the aperture 70 formed within the central portion 60 of the unit coupler. The elongated sleeve 80 may be positioned within an intake or exhaust port of a ventilation unit when the unit coupler 10 is secured to the unit and may provide support to the unit coupler upon insertion.

In one embodiment, a gasket or other sealing means may be placed around the aperture in contact with the central portion of the unit coupler. This gasket may provide a sealed interconnection between the unit coupler and the ventilation unit upon the securing of the unit coupler onto the ventilation unit. In this manner air loss at the attachment point of the unit coupler may be minimised.

In one embodiment, the unit coupler 10 may be secured to a ventilation unit with screws, bolts or any other fastening means as would be known by a worker skilled in the relevant art. Referring to FIG. 2b, predetermined fastening locations 90 maybe fabricated in the unit coupler 10 for the insertion of screws to secure the unit coupler 10 to a ventilation unit, wherein the ventilation unit may have corresponding fastening locations fabricated therein.

Conduit Coupler

Referring to FIG. 3a, the conduit coupler 20 comprises a central portion 100 in which an aperture 110 is formed having a cross sectional area similar to the cross sectional area of an intake or exhaust port commonly used in ventilation units or a conduit which can be attached to this port. The size and cross sectional shape of the aperture may be of any size or shape, depending on the application of the connection adapter.

Referring to FIG. 3c, the conduit coupler 20 has an inner hollow elongated sleeve 120 and an outer hollow elongated sleeve 160 extending from the central portion 100 of the conduit coupler 20. The inner elongated sleeve 120 is aligned with the aperture 110 in the central portion 100 and may have a cross sectional area and/or shape which may be uniform or vary over its length. In one embodiment of the invention, the inner elongated sleeve is formed in the shape of a funnel, wherein its cross section is greatest at a point adjacent the central portion of the conduit coupler. This funnel shaped inner elongated sleeve may facilitate easier installation of a conduit onto this sleeve, for example. In another embodiment, the inner elongated sleeve may have a rippled surface in order to facilitate the installation of a conduit onto the sleeve rather than a smooth or uniform surface.

Referring to FIG. 3d, in one embodiment, a number of protrusions 150 are formed on the exterior of the inner elongated sleeve 120 which may assist the securing of a conduit onto the inner elongated sleeve 120 such that the conduit may be restrained from slipping off the conduit coupler 20. As would be known to a worker skilled in the art, a flexible conduit may comprise helical shaped wire that provides the conduit with its shape and flexibility. In one embodiment, this wire can be restrained by these protrusions thereby preventing the conduit from slipping off of the inner elongated sleeve.

In one embodiment, further securing devices may be provided on the exterior of the inner elongated sleeve for the restraining of the conduit thereon. As illustrated in FIG. 3a these securing devices may be in the form of triangular protrusions 170 located near the central portion 100 of the conduit coupler 20. These triangular protrusions may restrain a wire within the conduit, for example.

Referring to FIG. 3c, the outer elongated sleeve 160 extends from the central portion 100 of the conduit coupler 20 having a cross section greater that the inner elongated sleeve 120 and projects in the same direction from the central portion 100 as the inner elongated sleeve 120. The outer elongated sleeve 160 may be used to secure a further conduit, sheath or membrane to the conduit coupler 20. Additionally, the outer sleeve 160 may also have a funnel shape or a constant cross sectional area along its length as defined for the inner elongated sleeve 120.

In one embodiment, the void which is defined by the space between the inner elongated sleeve and the outer elongated sleeve may be filled with a protective or insulating material over the length of the conduit for example. In this manner, a conduit incorporating this additional sheath or membrane with an insulating property may be readily connected to the conduit coupler. For example, this type of conduit may be used in an attic of a house for transferring heated or cooled air to rooms on the top floor. As would be known to a worker skilled in the art, an attic is typically hot in the summer and cold in the winter and therefore would adversely affect the air being transferred if the conduit was not insulated.

In one embodiment, the inner and outer elongated sleeves project from the central portion of the conduit coupler in a direction perpendicular to the central portion. In an alternate embodiment, these elongated sleeves project at an angle less than 90 degrees (perpendicular) to the plane of the central portion. For example, as would be known to a worker skilled in the art typical angles may be 22.5, 30, 45 or 60 degrees. Variations in the angle of the elongated sleeves associated with the conduit coupler can provide for the connection of a conduit in locations that are more restrictive or for directing the conduit in the desired direction, for example.

Interconnecting Means

Interconnecting means for enabling the mating of the conduit coupler to the unit coupler are operatively associated with the central portion of the unit coupler. The interconnecting means is a system that enables the easy attachment and removal of the conduit coupler to the unit coupler. As would be known to a worker skilled in the art, this type of connection is provided by sliding type connection and not a rotation type connection. If for example, the connection of the unit coupler and the conduit coupler necessitated the rotation of the conduit coupler with a conduit connected thereto, the rotation of the conduit coupler may inadvertently restrict the air flow provided by the conduit.

Figure 2C:
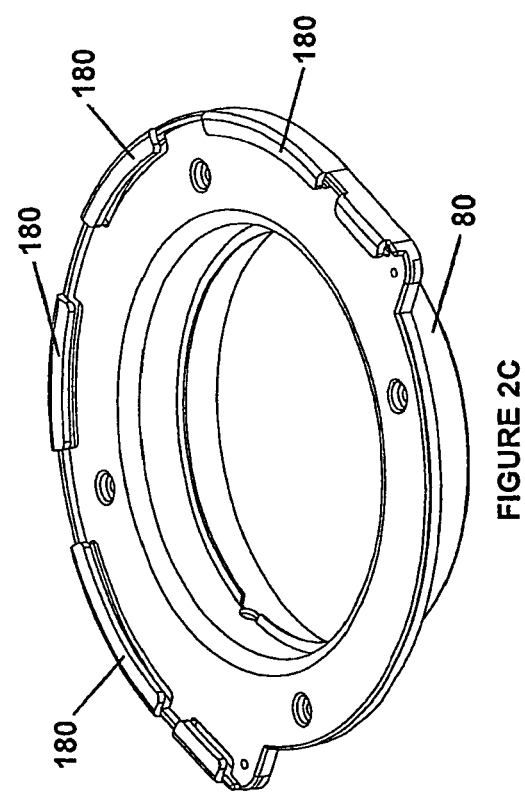
FIG. 2c is a second perspective view of the unit coupler of the present invention.
Figure 11:
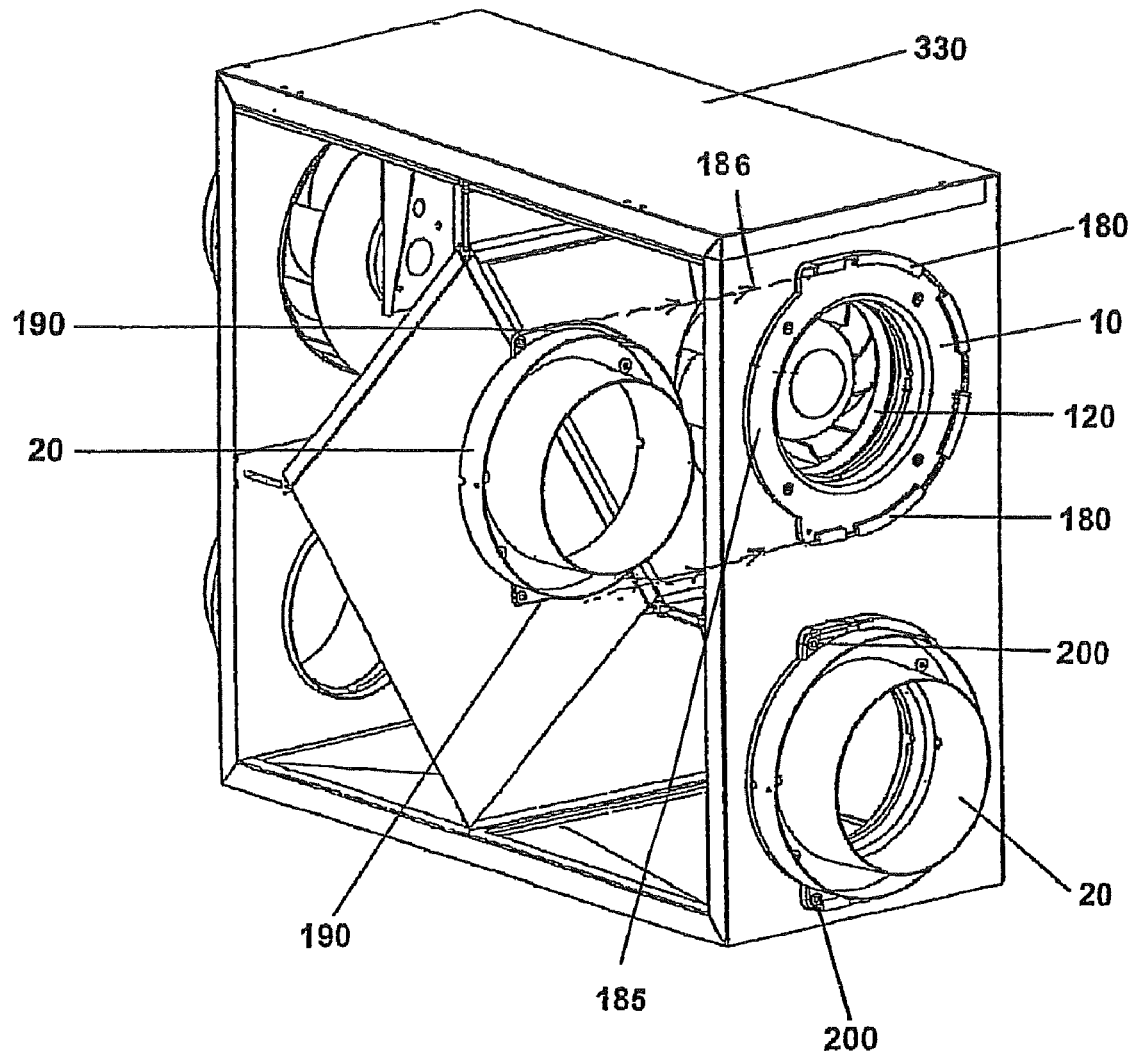
FIG. 11 is a perspective view of one embodiment of the present invention.

In one embodiment and with reference to FIG. 2c, a number of flanges 180 are provided around the perimeter region of the central portion 60 of the unit coupler 10 and dimensionally configured as shown in FIG. 11 to have at least one opening 185 between the flanges 180 that is at least as wide as a diameter 186 of the lip 190 on the conduit coupler 20 that enable interconnection of the conduit coupler 20 and the unit coupler 10 by lateral sliding of the lip 190 through the opening 185 between the flanges 180. These flanges can be formed in an "L" shape, wherein the top of the flange projects towards the aperture within the central portion of the unit coupler, for receiving the perimeter of the central portion of the conduit coupler.

In another embodiment, the securing means can be comprised of inwardly inclined flanges within the interconnection means. For example, the flanges are not "L" shaped but rather have an acute angle, i.e. less than 90 degrees. Such acute flanges may act as securing means by pinching the perimeter of the conduit coupler. The use of such a securing mechanism would require additional force to be applied to the conduit coupler in order to force the perimeter of the conduit coupler within the acute flanges of the unit coupler.

Interconnection means, which mate with the unit coupler, are provided on the central portion of the conduit coupler. For example the conduit coupler is aligned with the unit coupler and subsequently slid into a position at which the apertures of the unit coupler and the conduit coupler are essentially aligned and the couplers are connected.

In one embodiment and with reference to FIG. 3b, the interconnecting means associated with the conduit coupler 20 is a lip 190 fabricated along the perimeter region of the central portion 100 of the conduit coupler 20. This lip 190 mates with the flanges 180 provided on the unit coupler 10, thereby interconnecting these two components.

Securing Means

Figure 4:
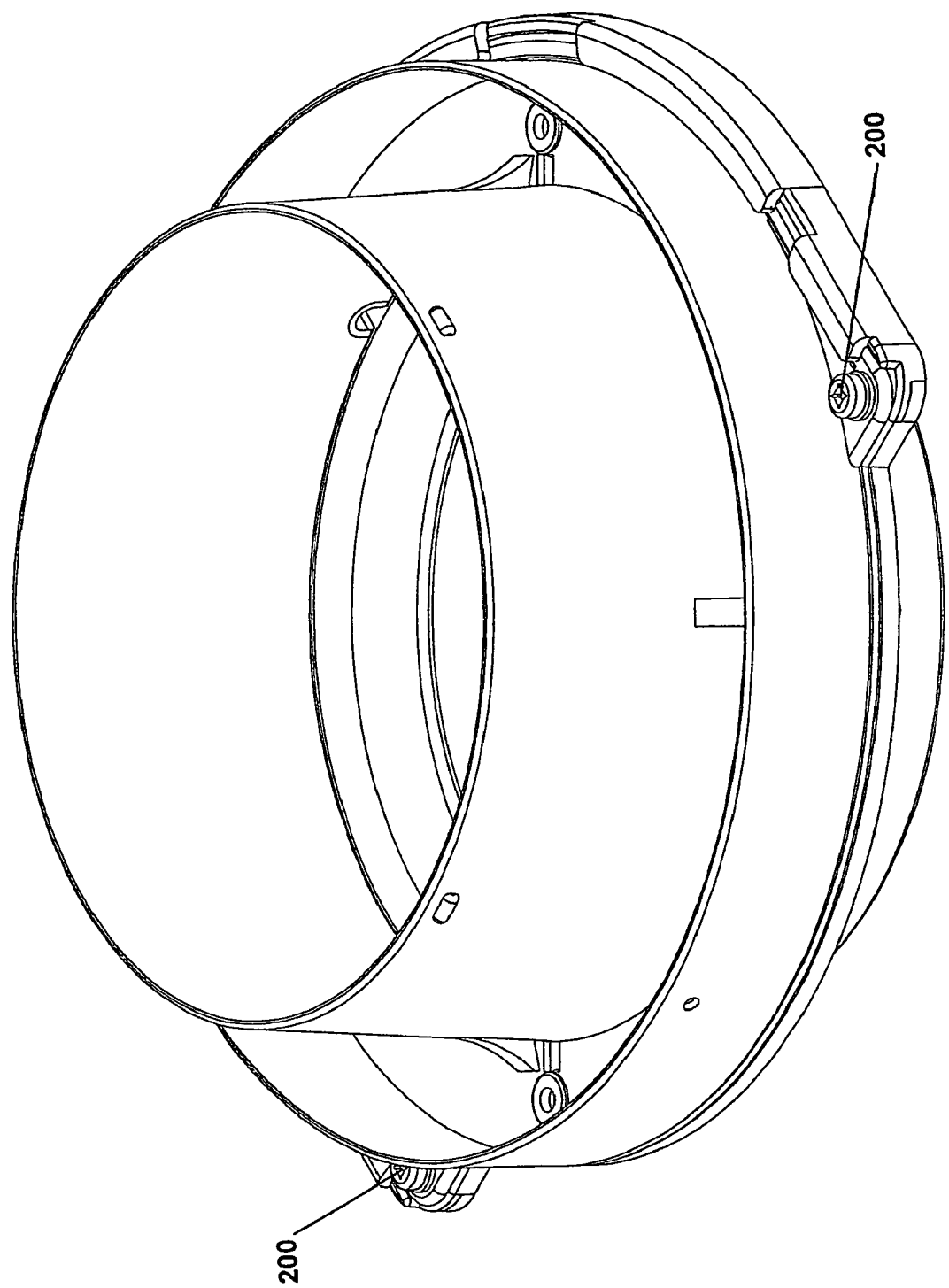
FIG. 4 is a first perspective view of one embodiment of the present invention.

In one embodiment, securing means fixedly and releasably connect the unit coupler and conduit coupler in a fixed or secure position. Referring to FIG. 4, bolts 200 may be used to restrict the movement of the couplers relative to one another upon their interconnection. However, any other securing means may be used, as would be known by a worker skilled in the relevant art, for example, screws or clips.

In one embodiment, the securing means are positioned in predetermined locations thereby providing assistance during the alignment of the conduit coupler with the unit coupler.

When the securing means are bolts, these predetermined locations may comprise threaded bores for receiving the bolts.

The components of the connection adapter may be fabricated from a variety of different materials such as plastic, fiberglass, metal or alloys. The choice of fabrication material may be influenced by material cost, manufacturing cost, strength, heat resistance and durability, for example. A worker skilled in the art would understand what material would be best suited for the connection adapter. For example, sheet metal may be used to construct the connection adapter, since it is thin and easily bent, stamped or crimped in order to fabricate the various components of the adapter. As would be known to a worker skilled in the art sheet metal is typically used for the fabrication of elements used in heating, ventilation and air conditioning (HVAC) systems. Alternatively, the components can be fabricated from PVC, ABS or other synthetic materials.

In one embodiment and with reference to FIGS. 5a through 5c, a balance flap 210 may be incorporated in the unit coupler. The addition of a balance flap may enable an improved control of fluid flow to and from the ventilation unit. This balance flap may not fully restrict the flow to and from the ventilation unit since the cross section of the balance flap is smaller that that of the aperture within the unit coupler.

Figure 6C:
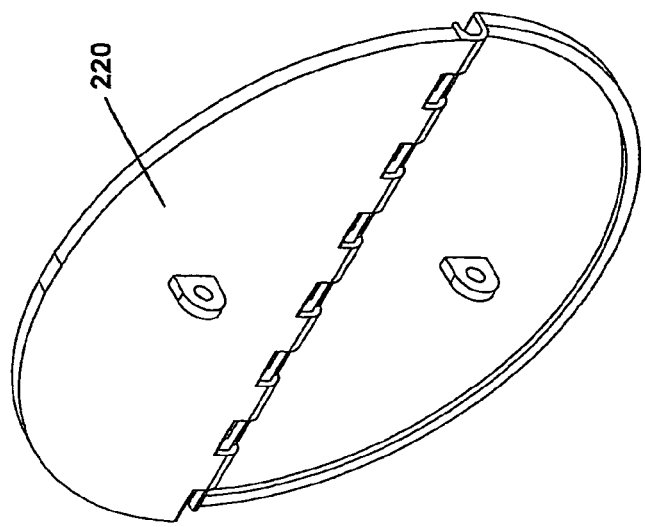
FIG. 6c is a perspective view of a control flap under one embodiment of the present invention.
Figure 6B:
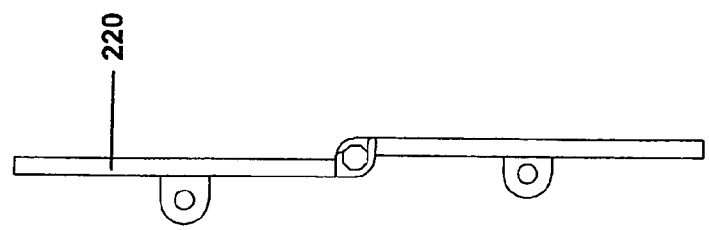
FIG. 6b is a side perspective view of a control flap under one embodiment of the present invention.
Figure 6A:
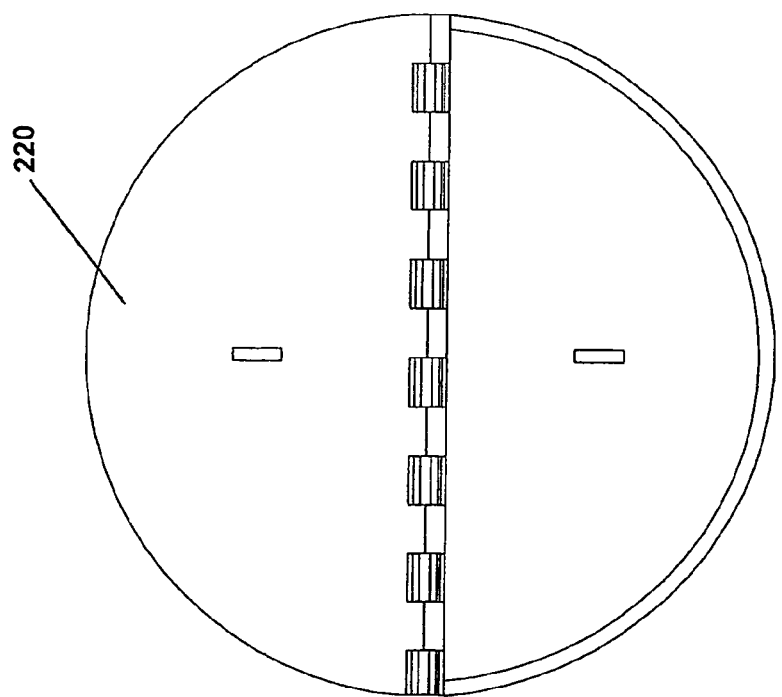
FIG. 6a is plan view of a control flap under one embodiment of the present invention.

In another embodiment and with reference to FIGS. 6a through 6c, a control flap 220 may be incorporated in a unit coupler. The addition of a control flap may provide improved control of fluid flow to and from the ventilation unit A control flap may provide a means for almost fully restricting the flow to and from the ventilation unit.

Figure 7B:
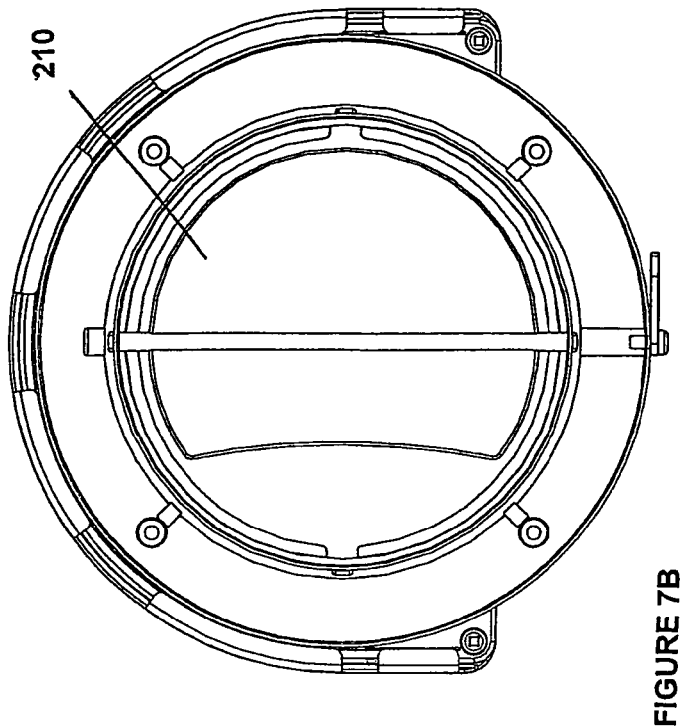
FIG. 7b is a plan view of one embodiment of the present invention.
Figure 7C:
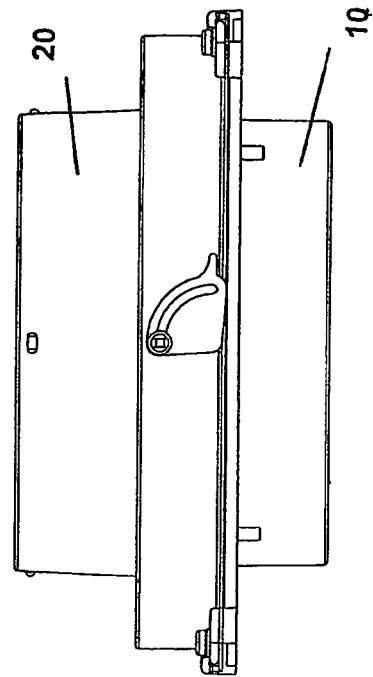
FIG. 7c is an elevation view of one embodiment of the present invention.
Figure 7A:
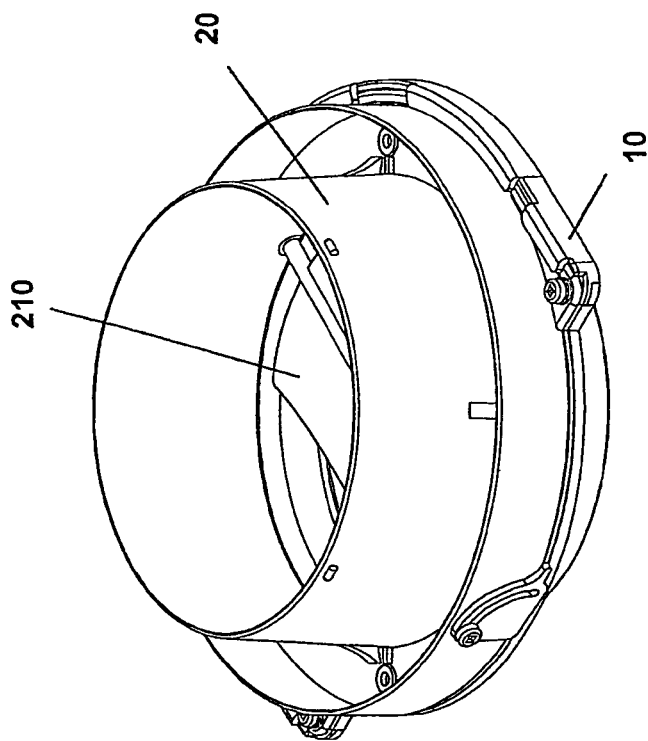
FIG. 7a is a perspective view of one embodiment of the present invention.

In one embodiment, FIGS. 7a through 7c illustrate a balance flap 210 which has been positioned within a unit coupler 10 which has been interconnected and secured to a conduit coupler 20.

Figure 8B:
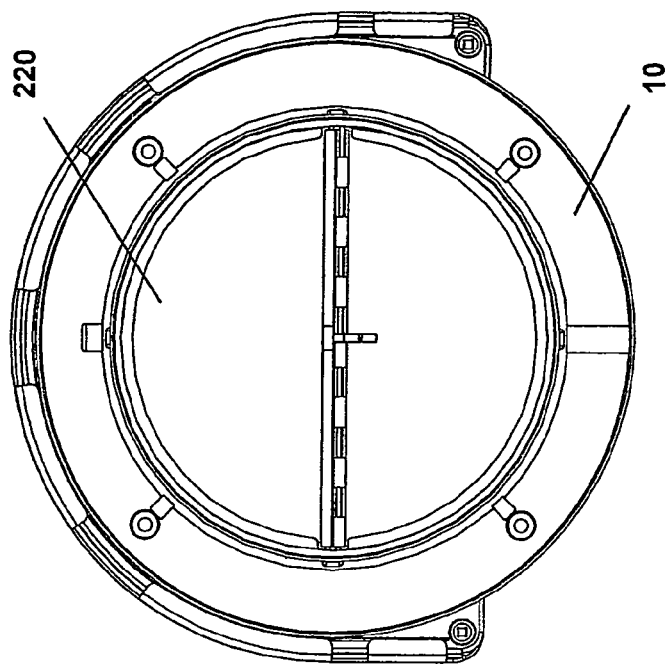
FIG. 8b is a plan view of one embodiment of the present invention.
Figure 8A:
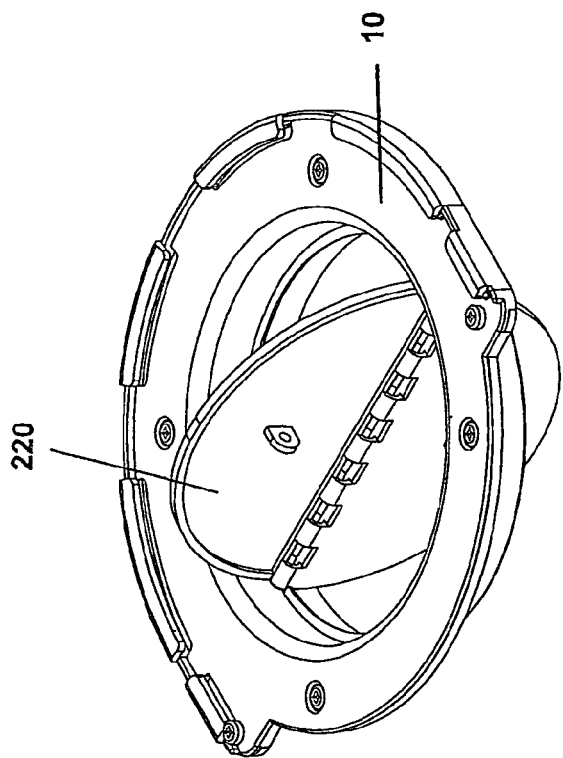
FIG. 8a is a perspective view of one embodiment of the present invention.

In one embodiment, FIG. 8a through 8b illustrate a control flap 220 which has been positioned within a unit coupler 10.

In one embodiment and with reference to FIG. 9a, a unit coupler 10 is secured to a first port 230 of a ventilation unit 240. In addition, a conduit coupler 20 is interconnected and secured to a unit coupler 10 positioned on a second port 250 of the ventilation unit 240.

With reference to FIG. 9b, connection adapters 260 are secured to both ports of a ventilation unit 270.

Figure 10:
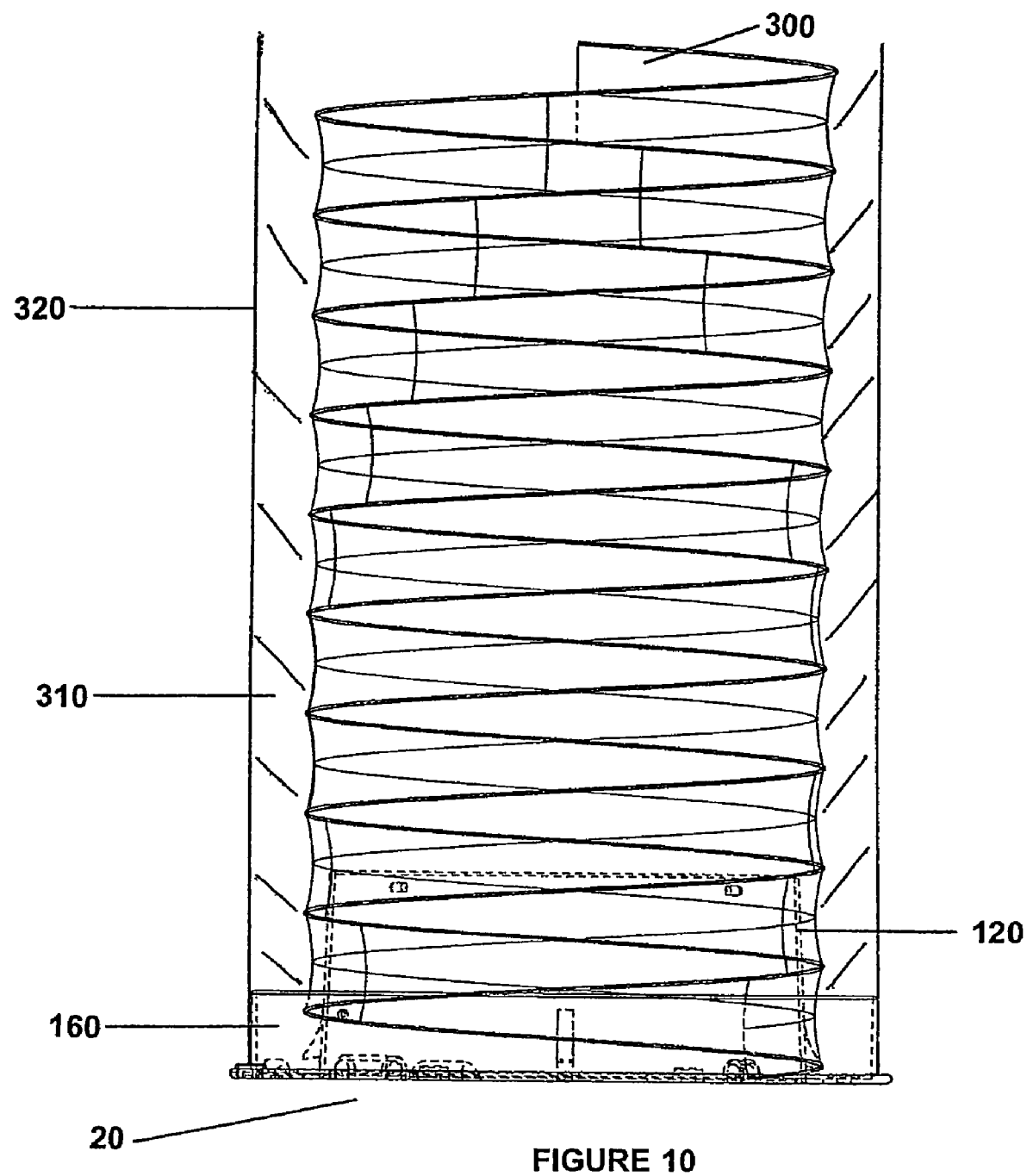
FIG. 10 is a plan view of one embodiment of the present invention.

In one embodiment and with reference to FIG. 10, a conduit 300 is attached to the inner elongated sleeve 120 of a conduit coupler 20. Insulation 310 is then placed around the conduit 300 attached to the conduit coupler 20. Once the insulation 310 is positioned around the conduit 300, a covering membrane 320 or sheath may be attached to the outer sleeve 160 of the conduit coupler 20 to shield and possibly protect the insulation 310 positioned around the conduit.

To gain a better understanding of the invention described herein, the following example is set forth. It should be understood that this examples is for illustrative purposes only. Therefore, it should not limit the scope of this invention in any way.

EXAMPLE 1

Referring to FIG. 11, the unit coupler 10 is secured to a ventilation unit 330 by placing the unit coupler's elongated sleeve 120 into the intake port of the ventilation unit, such that the interconnecting means, for example flanges 180 is positioned on the outside surface of the ventilation unit.

The conduit coupler 20 may then be secured to the unit coupler 10 through the interconnecting means by placing the couplers in contact and sliding the conduit coupler 20 laterally relative to the ventilation unit coupler 10 thereby mating the lip 190 of the conduit coupler 20 with the flanges 180 of the unit coupler 10. Once the conduit coupler 20 is completely aligned with the unit coupler 10, thereby enabling fluid transfer there between, commonly known securing means, for example bolts or screws 200, may be used to secure the couplers in a fixed position. If the securing means are removed, the conduit coupler 20 can be removed from the unit coupler 10 by sliding it in the reverse direction of its installation thereby enabling maintenance to be performed on the unit 330, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A connection adapter for use with a flexible or rigid conduit that fluidingly interconnects with an intake or exhaust port of a ventilation unit and a conduit, the adapter comprising:
    (a) a unit coupler having a central portion with an aperture, a perimeter region and an elongated sleeve extending from the central portion and aligning with the aperture;
    (b) a conduit coupler having a central portion with an aperture, a perimeter region and an inner elongated sleeve extending from the central portion and aligning with the aperture of the conduit coupler and the conduit coupler having an outer elongated sleeve extending from the central portion in the same direction as the inner sleeve;
    (c) a connector positioned on the perimeter region of the central portion on the unit coupler and a lip positioned on the perimeter region of the conduit coupler that slides laterally to engage underneath the connector thereby enabling interconnection; and
    (d) a releaseable connector for securing the unit coupler to the conduit coupler when slidingly engaged wherein the conduit coupler is easily connected or disconnected to the unit coupler once the releaseable connector is removed, wherein the lateral sliding direction is perpendicular to the axial direction of the unit coupler and the conduit coupler.

2. A connection adapter as described in claim 1 wherein the connector is comprised of flanges positioned on the perimeter region of the unit coupler that engages the lip portion positioned on the perimeter region of the conduit coupler.

3. A connection adapter as described in claim 1 wherein the elongated sleeve of the unit coupler has a funnel shape.

4. A connection adapter as described in claim 1 wherein the inner and outer elongated sleeves of the conduit coupler have funnel shapes.

5. A connection adapter as described in claim 1 wherein the inner and outer elongated sleeves of the conduit coupler have rippled surfaces.

6. A connection adapter as described in claim 1 wherein the inner elongated sleeve of the conduit coupler has protrusions on its surface.

7. A connection adapter as described in claim 1 wherein the inner and outer elongated sleeves of the conduit coupler are not perpendicular to the connector surface.

8. A connection adapter as described in claim 1 wherein the releaseable connectors are screws.

9. A connection adapter as described in claim 1 wherein an insulation material may be positioned in a space between a first conduit attached to the inner elongated sleeve of the conduit coupler and an outer barrier attached to the outer elongated sleeve of the conduit coupler.

10. A connection adapter for use with a flexible or rigid conduit that fluidingly interconnects with an intake or exhaust port of a ventilation unit and a conduit, the adapter comprising:
   (a) a unit coupler having a central portion with an aperture, a perimeter region and an elongated sleeve extending from the central portion and aligning with the aperture;
   (b) a conduit coupler having a central portion with an aperture, a perimeter region and an inner elongated sleeve extending from the central portion and aligning with the aperture of the conduit coupler and the conduit coupler having an outer elongated sleeve extending from the central portion in the same direction as the inner sleeve;
   (c) an interconnecting mechanism comprising flanges positioned around a portion of the perimeter region of the unit coupler for engagement with a lip portion positioned on the perimeter region of the conduit coupler, wherein the flanges are positioned to allow lateral sliding entry of the lip between an opening of the flanges on the perimeter region of the unit coupler; and
   (d) a releaseable connector for securing the unit coupler to the conduit coupler wherein the conduit coupler is easily connected or disconnected to the unit coupler once the releaseable connector is removed, wherein the lateral sliding direction is perpendicular to the axial direction of the unit coupler and the conduit coupler.

11. A connection adapter as described in claim 10 wherein the elongated sleeve of the unit coupler has a funnel shape.

12. A connection adapter as described in claim 10 wherein the inner and outer elongated sleeves of the conduit coupler have funnel shapes.

13. A connection adapter as described in claim 10 wherein the inner and outer elongated sleeves of the conduit coupler have rippled surfaces.

14. A connection adapter as described in claim 10 wherein the inner elongated sleeve of the conduit coupler has protrusions on its surface.

15. A connection adapter as described in claim 10 wherein the inner and outer elongated sleeves of the conduit coupler are not perpendicular to the interconnecting mechanism surface.

16. A connection adapter for use with a flexible or rigid conduit that fluidingly interconnects with an intake or exhaust port of a ventilation unit and a conduit, the adapter comprising:
   (a) a unit coupler having a central portion with an aperture, a perimeter region and an elongated sleeve extending from the central portion and aligning with the aperture;
   (b) a conduit coupler having a central portion with an aperture, a perimeter region and an inner elongated sleeve extending from the central portion and aligning with the aperture of the conduit coupler and the conduit coupler having an outer elongated sleeve extending from the central portion in the same direction as the inner sleeve;
   (c) a plurality of angled flanges on the perimeter region of the unit coupler that engages over a lip on the perimeter region of the conduit coupler which mates when slid laterally between the angled flanges; and
   (d) a releaseable connector for securing the unit coupler to the conduit coupler wherein the conduit coupler is easily connected or disconnected to the unit coupler once the releaseable connector is removed, wherein the lateral sliding direction is perpendicular to the axial direction of the unit coupler and the conduit coupler.

17. A connection adapter as described in claim 16 wherein the inner and outer elongated sleeves of the conduit coupler have funnel shapes.

18. A connection adapter as described in claim 16 wherein the inner and outer elongated sleeves of the conduit coupler have rippled surfaces.

19. A connection adapter as described in claim 16 wherein the inner elongated sleeve of the conduit coupler has protrusions on its surface.

20. A connection adapter as described in claim 16 wherein the inner and outer elongated sleeves of the conduit coupler are not perpendicular to a base surface of the angled flanges.

* * * * *